W. C. COOPER.
BRAKE FOR VEHICLES.
APPLICATION FILED JULY 17, 1911.
1,040,515.
Patented Oct. 8, 1912.
2 SHEETS—SHEET 1.
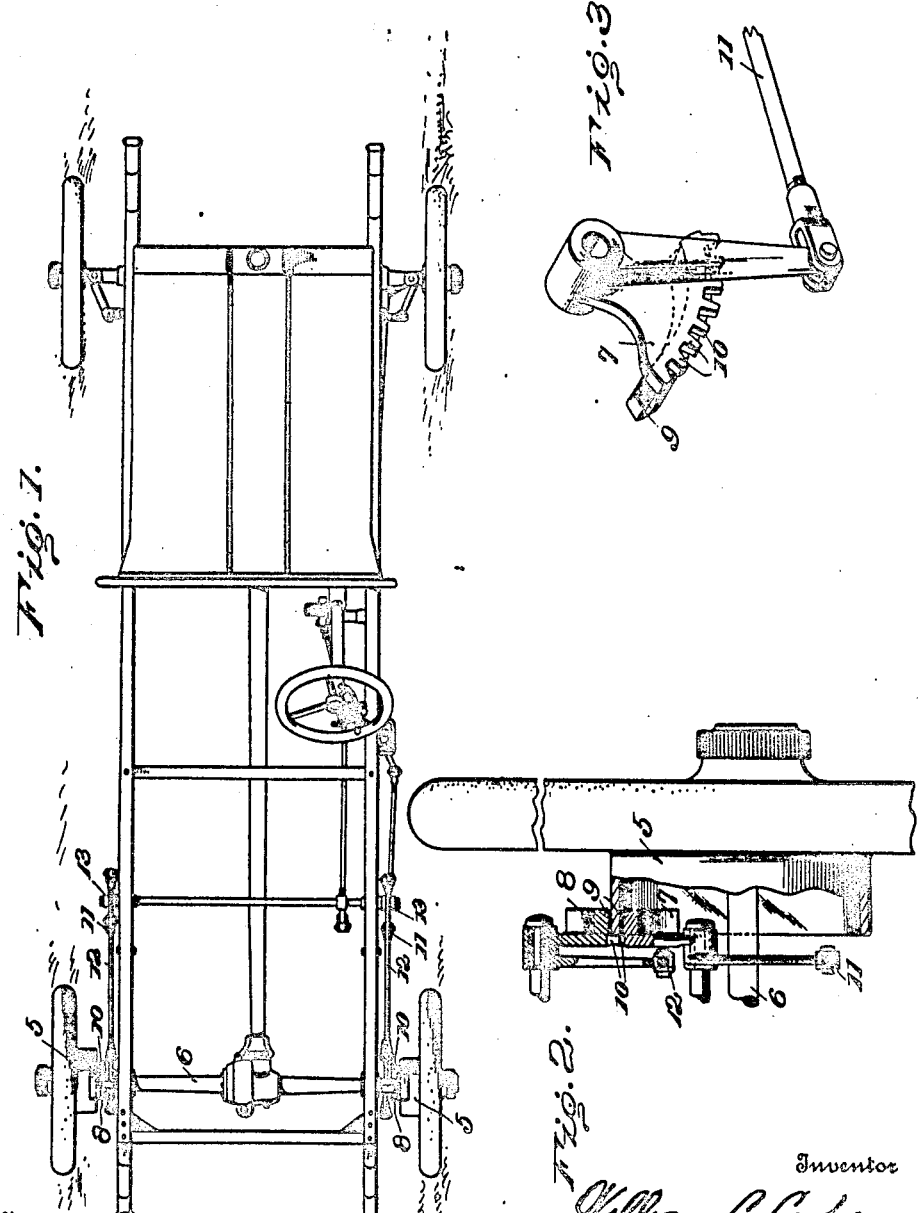

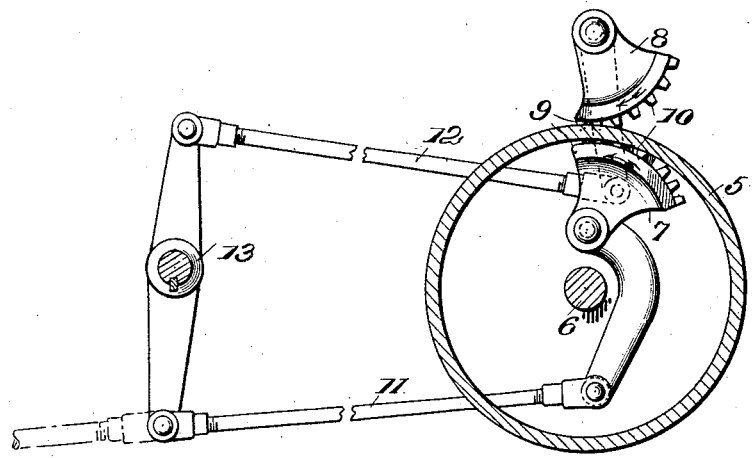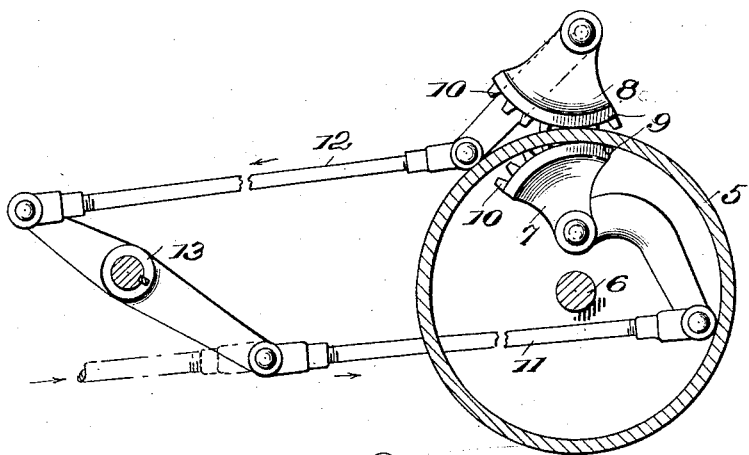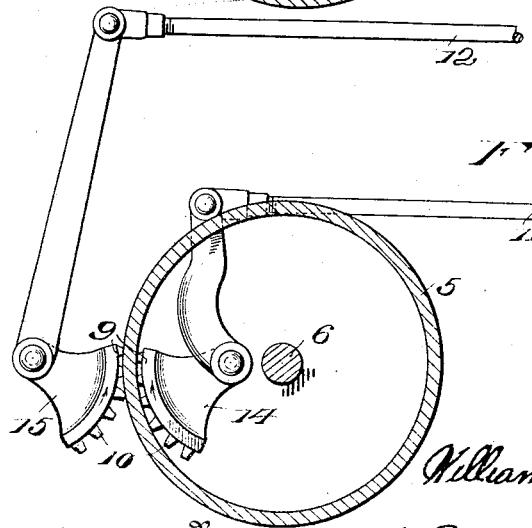

UNITED STATES PATENT OFFICE.

WILLIAM C. COOPER, OF SPRINGFIELD, ILLINOIS.

BRAKE FOR VEHICLES.

1,040,515.  Specification of Letters Patent.  Patented Oct. 8, 1912.

Application filed July 17, 1911. Serial No. 638,953.

*To all whom it may concern:*

Be it known that I, WILLIAM C. COOPER, a citizen of the United States, residing at Springfield, in the county of Sangamon and State of Illinois, have invented a certain new and useful Brake for Vehicles, of which the following is a specification.

The principal object is to provide a comparatively simple, inexpensive, and reliable, auxiliary or emergency brake for motor vehicles.

Another object is to provide a brake of the type recited the braking elements whereof respond instanter to the application or removal of pressure.

Another object is to provide braking elements that are self-locking and which lock and release interdependently.

Other objects, as well as the nature, characteristic features, and scope of the invention, will be readily understood from the following description taken in connection with the accompanying drawings forming a part hereof, which illustrate merely by way of example, an embodiment of the invention in an automobile brake.

Figure 1, is a top view of the running gear, showing one of the various ways of embodying the invention. Fig. 2, is a sectional view of the brake drum and brake shoes. Fig. 3, is a detail, illustrating more particularly the gear segment for coupling the complemental clamps or shoes. Figs. 4 and 5, illustrate different positions of the clamps and actuating levers, the former when the drum is running free, the latter when the drum is locked. Fig. 6, illustrates a varied form in which the shoes bind or clamp the drum at a point in rear of the driving axle.

The brake drum 5, or its equivalent, is mounted in any suitable manner so as to rotate with the driving axle 6. The brake shoes 7 and 8 are mounted so as to be brought into or out of engagement with the inner and outer walls of the periphery of the drum.

The system of control for effecting the locking or release since it depends in a measure upon the design or style of the car is not directly concerned here and will only be referred to at large. Suffice it to say that the structure, arrangement, and operation of the braking elements are so comparatively simple and their action so positive that it is a matter of choice whether the same be controlled by hand or foot. Fig. 1, shows two sets of braking devices, but as previously explained this is by way of illustration only and whether or not the brakes are duplicated will depend upon certain conditions, such as the power and size of the car.

The inner and outer clamps or brake shoes 7 and 8 are substantially complements one of the other. They are in the form of sectors with a bearing or clamping surface 9, and with a segmental gear 10, to one side thereof and formed integral with the sector body. The gears 10, intermesh so that a movement of one shoe effects a movement of the other. The bearing or clamping surfaces 9, of the respective shoes are eccentric to the axes of rotation or partial rotation of the shoes so that the farther they advance the more their binding action upon the brake drum is accelerated. The shoes are carried by pivotal arms 11, 12, whose movements are controlled by a brake actuator 13 of any suitable type, as before explained. Obviously a movement of the parts in one direction will lock the drum and a reverse movement will release it.

In Figs. 4 and 5, the braking elements or shoes 7 and 8, are illustrated as being located above and substantially in line with the axle. Fig. 6, illustrates a variation, wherein the shoes 14 and 15 are located in rear of and in the plane of the axle, but the principle is the same.

It will be obvious to those skilled in the art to which the invention relates that modifications may be made in details without departing from the spirit and scope of the invention. Hence the same is not limited other than required by the state of the art.

Having described the nature and objects of the invention, I claim:—

1. In combination, a brake drum, inner and outer pivotal shoes having eccentric bearing or grinding surfaces and intermeshing segmental gears, and suitable actuating mechanism.

2. In combination a brake drum, inner and outer shoes having eccentric bearing or friction surfaces, said shoes being in the form of sectors provided edgewise with intermeshing teeth whereby the shoes are mutually responsive, and suitable actuating mechanism.

In testimony whereof I have hereunto signed my name in the presence of two subscribing witnesses.

WILLIAM C. COOPER.

Witnesses:
J. V. FORTHMAN,
CHAS. O. MILLER.

Copies of this patent may be obtained for five cents each, by addressing the "Commissioner of Patents, Washington, D. C."